April 8, 1952  H. F. RIDGELY ET AL  2,591,967

ANTIFRICTION DEVICE FOR PLANETARY TRANSMISSIONS

Filed April 26, 1951

INVENTORS:
Holland F. Ridgely
Floyd A. Crocker

Leonard S. [signature]
Attorney

Patented Apr. 8, 1952

2,591,967

UNITED STATES PATENT OFFICE 2,591,967

ANTIFRICTION DEVICE FOR PLANETARY TRANSMISSIONS

Holland F. Ridgely, Grand Island, N. Y., and Floyd A. Crocker, Jenison, Mich., assignors to Lear, Incorporated, Grand Rapids, Mich., a corporation of Illinois Application April 26, 1951, Serial No. 223,085

12 Claims. (Cl. 74—801)

This invention relates to gear trains. In particular it has reference to improvements in planetary gear trains and like devices of the type wherein the planet gears and carriers therefor or similar relatively rotatable parts thereof, which are located in close adjacency, are prevented from direct rubbing interaction and the power loss due to friction substantially reduced.

In the interests of conserving space the several stages of a multiple-stage planetary gear train are frequently arranged closely adjacent. Such result may be most conveniently achieved by providing disc-like carriers or spiders for the planetary gears to one side of which the sun gear is secured, and the carrier is provided with a plurality of studs upon each of which a planetary gear is mounted for rotation. Moreover a common internal or ring gear may be provided for all of the planetary gears, which ring gear, because of the compact arrangement of the several sun and planet gear assemblies, may be maintained short enough axially to enable the teeth to be cut therein in an accurate and economical manner.

However, in gearing arrangements constructed as aforesaid, difficulty is encountered by reason of the mutual rubbing or sliding friction between adjacent carriers including the planetary gear studs or between a carrier and the planet gears of an adjoining carrier, and with consequent loss of efficiency. Such friction loss is caused not only by sliding friction as noted, but is aggravated by eccentricity in the carriers and misalignment of the parts. In effect the several stages tend to behave in the manner of a disc clutch. Insertion of thrust type caged ball bearings of conventional design is excluded because of space limitations, and a bronze or similar thrust washer is of little or no advantage in improving the transmission efficiency.

Accordingly the principal object of the invention is to provide anti-friction bearing means intermediate successive stages of a planetary transmission or similar device to decrease mutual friction between the adjoining parts.

A further object is to provide anti-friction means as aforesaid adapted to occupy a minimum space axially of the transmission.

Another object is to provide anti-friction means as stated which shall comprise a minimum of parts, and which shall be reliable in function.

Broadly regarded, the improvement contemplates the insertion in holes through the planetary gear studs of a plurality of balls, of such diameter relative to the axial length of the studs as to cause the end balls to protrude slightly beyond the ends of the studs, and the provision of washer-like scuff or bearing plates against which the balls may roll.

In the drawing which shows a preferred mode of embodying the invention in practice:

Figure 1:
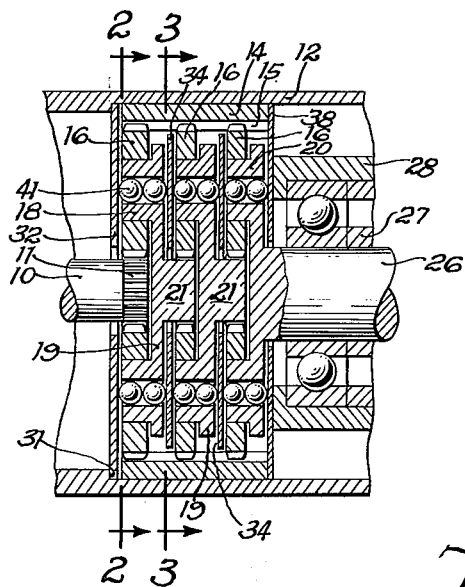
Fig. 1 shows a longitudinal cross section taken axially through a planetary transmission including the improvement.
Figure 2:
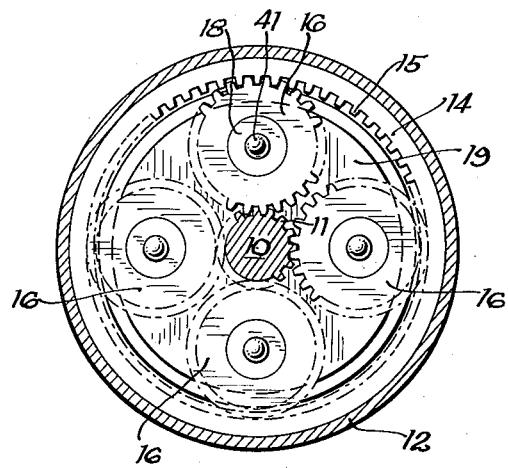
Fig. 2 shows a cross-section taken on the line 2—2 of Fig. 1.
Figure 3:
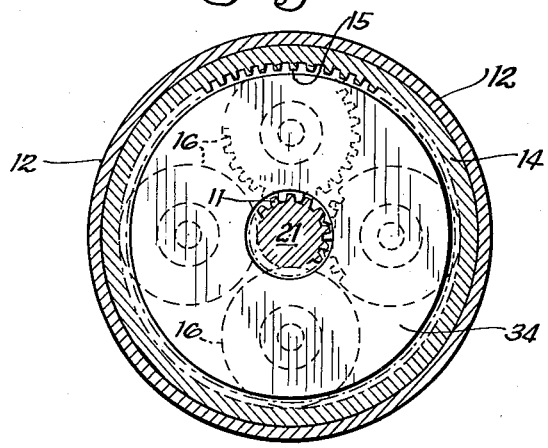
Fig. 3 shows a cross section taken on the line 3—3 of Fig. 1.

Referring to this drawing, which, by way of example, shows a three stage planetary gear reduction or transmission, input power is supplied to a shaft 10 rotated by a suitable prime mover, e. g. an electric motor. Support for the shaft 10 may be the adjacent bearing of the motor proper, or any other suitable bearing may be provided. In any case the motor and such bearing have not been shown. Shaft 10 is provided with an input pinion 11 in mesh with the first set of planetary gears to be described.

A shell-like housing 12, preferably cylindrical in form, and which may be a continuation of the motor frame, serves to support the several elements to be detailed hereinafter. Press-fitted into the housing is the internal or ring gear 14 having teeth 15 with which the several groups of planetary gears 16 are adapted to mesh. Although these latter are shown in groups of four each it will be understood that the stated number thereof is not intended to be limitative, nor is the number of reduction stages, in this case three, to be similarly regarded.

Each of the planetary gears 16 is rotatably mounted on a stud or pivot 18 which are severally secured to or made integral with the carriers 19 and 20. Preferably such studs are provided with a neck portion which is press-fitted into a hole in the carrier and staked or otherwise secured. Each of the first two carriers is provided with a sun gear 21—21 in mesh with the planetary gears of the succeeding stage. The sun gears 21—21 may be secured in the same manner as the studs 18, if desired. The last carrier 20 is formed integral with or is affixed to an output shaft 26 rotatably carried in a bearing 27, which is in turn mounted in a support 28 forming part of the housing 12. Shaft 26 is arranged to be coupled to a driven member (not shown).

Press-fitted into the housing 12, and aligned by means of a shoulder 31 therein, is a left end scuff or bearing plate or disc 32. Intermediate the carriers 19—19 and carriers 19 and 20 are two additional bearing plates or discs 34—34 which are free to rotate upon the periphery of each of the sun gears 21—21, the plates being suitably apertured for such rotatable relationship. The outer diameter of the scuff plates is selected to clear the teeth of the ring gear 14. A right hand scuff plate or disc 38 is rigidly held intermediate the ring gear 14 and support 28. The end scuff plates obviously have a central clearance aperture as shown. All of the scuff plates are preferably of hardened steel. If desired the intermediate scuff plates 34—34 may be held non-rotatably, as by providing projections on the periphery thereof adapted to engage the teeth 15 of the internal gear 14. Alternatively all of the plates may be rotatably supported.

Each of the studs 18 is bored through to receive in rotatable relation a pair of balls 41 of such diameter as to insure that not only will adjacent balls be in rolling contact, but that the balls will roll on the several scuff plates. If desired one of the end plates may be rendered adjustable axially to insure the foregoing requirement, or a resilient backing may be provided for one of the end plates and for the same purpose.

From the foregoing description it will have become clear that each of the several planetary stages is provided on both sides with an anti-friction bearing which is effective to relieve excessive loading due to mutual friction therebetween and which would occur in the absence of the invention improvement.

The invention has been found particularly advantageous when the transmission is operated in a vertical position, wherein the objectionable friction heretofore alluded to is a maximum. A unit without the improvement was mounted in a vertical position with the motor down, loaded with dead weights, and the results of so operating the unit were compared with those obtained from a unit which was otherwise similar except that it included the invention improvement. The results are compared as follows:

| Unit Without Improvement | | Unit With Improvement | |
| --- | --- | --- | --- |
| Output Torque in lb.-in. | Transmission Efficiency— Per cent | Output Torque in lb.-in. | Transmission Efficiency— Per cent |
| 32.5 | 1.42 | 32.5 | 8.52 |
| 195.0 | 4.63 | 195.0 | 28.10 |
| | | 260.0 | 33.60 |

The unit without the improvement stalled at loads above 195 lb.-in., whereas the unit with the improvement had not stalled at loads above 260 lb.-in., although the test was terminated upon the latter figure having been reached. It will be apparent that the invention improvement improves the speed characteristics of the transmission, and will decrease the power required of the driving motor.

One of the outstanding advantages of the invention lies in the utilization of the studs 18 as carriers for the balls. By means of this arrangement the unit need not be lengthened as would be the case if a conventional ball-type thrust bearing were employed. The plates 32 and 34 may be of thin stock and therefore add to the overall axial dimension only to a negligible degree.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

Having thus described our invention, what we claim and desire to secure by Letters Patent is:

1. A planetary gear transmission comprising a plurality of sets of planetary gears, a carrier for each set of planetary gears; sun gears; a ring gear for engagement with said planetary gears; each said carrier having a plurality of studs upon each of which a planetary gear is rotatably carried; an input shaft secured to the first sun gear; an output shaft secured to the last carrier; and anti-friction means comprising scuff plates adjacent each stage of reduction and a plurality of balls positioned between each pair of adjacent plates; said studs having axial apertures therein for rotatably supporting said balls.

2. A transmission as recited in claim 1 further characterized in that the endmost scuff plates are fixed and the intermediate scuff plates are suported for rotation relatively to the carriers.

3. A planetary gear transmission comprising a plurality of planetary gears, a carrier for each set of planetary gears; sun gears, a ring gear for engagement with said planetary gears; each said carrier having a plurality of studs upon each of which a planetary gear is rotatably carried; an input shaft secured to the first sun gear; an output shaft secured to the last carrier; and anti-friction means comprising a scuff plate adjacent a carrier and a plurality of balls adapted to roll against said plate, said studs having apertures for seating said balls.

4. A planetary gear transmission comprising a ring gear, a sun gear, an input shaft operatively connected to said sun gear, a plurality of planetary gears and a carrier therefor, means for supporting said carrier for rotation, an output shaft operatively connected to said carrier, said carrier having a plurality of studs upon which said planetary gears are supported for rotation, and anti-friction means for relieving loading due to axial thrust of the rotating parts of the transmission including a rigid plate positioned at each side of the gear train and a plurality of balls intermediate said plates and in rolling contact therewith, said studs having apertures for rotatably receiving said balls.

5. A transmission as recited in claim 4 in which each said aperture is arranged to receive a pair of balls in axial side-by-side relation.

6. A transmission as recited in claim 4 in which at least one of said plates is provided with peripheral projections in engagement with the teeth of the ring gear.

7. A planetary gear transmission comprising a housing, a ring gear, a sun gear, an input shaft operatively connected to said sun gear, a plurality of planetary gears and a carrier therefor, means for supporting said carrier for rotation, an output shaft operatively connected to said carrier, said carrier having a plurality of studs upon which said planetary gears are supported for rotation, and anti-friction means for relieving loading due to axial thrust of the rotating parts of the transmission including a pair of rigid plates supported in said housing, said plates being positioned respectively at opposite sides of the gear train, and a plurality of balls intermediate said plates and in rolling contact therewith, said studs having apertures for rotatably receiving said balls.

8. Means for relieving loading due to end thrust resulting from rotation of the rotating parts of a planetary gear transmission which includes a housing, at least one carrier and planetary gears rotatable on hollow studs mounted in said carrier which comprises a pair of fixed, rigid plates supported in the housing, one at each side of the transmission, and a plurality of balls, said balls being positioned intermediate said plates for rolling contact therewith and supported rotatably in apertures in said studs.

9. A multiple-stage planetary gear transmission comprising a housing, a ring gear, a plurality of groups of planetary gears, a carrier for each group, an input sun gear, sun gears carried by certain of said carriers, an output shaft secured to an end of one of said carriers, a plurality of studs affixed to each carrier for rotatably supporting individual planetary gears, at least some of said studs having an aperture therein, a plurality of balls rotatably carried in said apertures, a plate adjacent each outermost carrier, a plate positioned intermediate each pair of adjacent carriers, said plates being arranged to receive pressure of said balls.

10. A transmission as recited in claim 9 in which said plates are non-rotatably supported.

11. A transmission as recited in claim 9 in which said outermost plates are non-rotatably supported, and said intermediate plates are rotatably supported.

12. A transmission as recited in claim 9 in which all said plates are rotatably supported.

HOLLAND F. RIDGELY.
FLOYD A. CROCKER.

No references cited.